United States Patent
Doan Huu

(10) Patent No.: US 12,481,919 B2
(45) Date of Patent: Nov. 25, 2025

(54) DISCRIMINATION LIKELIHOOD ESTIMATE FOR TRAINED MACHINE LEARNING MODEL

(71) Applicant: BUSINESS OBJECTS SOFTWARE LTD., Dublin (IE)

(72) Inventor: Jacques Doan Huu, Montigny le Bretonneux (FR)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 882 days.

(21) Appl. No.: 17/728,259

(22) Filed: Apr. 25, 2022

(65) Prior Publication Data

US 2023/0342659 A1  Oct. 26, 2023

(51) Int. Cl.
*G06N 20/00* (2019.01)

(52) U.S. Cl.
CPC .................................. *G06N 20/00* (2019.01)

(58) Field of Classification Search
CPC .................. G06N 20/00; G06N 3/08
See application file for complete search history.

(56) References Cited

U.S. PATENT DOCUMENTS

| | | | |
|---|---|---|---|
| 2020/0302309 A1* | 9/2020 | Golding | G06N 5/04 |
| 2023/0115067 A1* | 4/2023 | Cmielowski | G06N 3/08 |
| | | | 706/12 |

\* cited by examiner

*Primary Examiner* — Grace Park
(74) *Attorney, Agent, or Firm* — Buckley, Maschoff & Talwalkar LLC

(57) ABSTRACT

Systems and methods include reception of a plurality of records, each of the plurality of records associating each of a plurality of features with a respective value, a second feature with a value, and a target feature with a value, a first machine learning model trained based on the plurality of records to output a value of the target feature based on values of each of the plurality of features, a second machine learning model trained based on the plurality of records to output a value of the second feature based on the values of each of the plurality of features, determination, based on the trained second machine learning model, of a first one or more of the plurality of features which are correlated to the second feature, determination of an influence of each of the first one or more features on the trained first machine learning model, and determination of a first value associated with the second feature based on the determined influences and on the trained second machine learning model.

20 Claims, 8 Drawing Sheets

400

| Feature 0 | Feature 1 | Feature 2 | Feature 3 | Feature 4 | Feature 5 | Target |
|---|---|---|---|---|---|---|
|  |  |  |  |  |  |  |
|  |  |  |  |  |  |  |
|  |  |  |  |  |  |  |
|  |  |  |  |  |  |  |

| Feature 0_inf | Feature 1_inf | Feature 3_inf | Feature 4_inf | Feature 5_inf |
|---|---|---|---|---|
| .2150 | .8546 | .544 | .0189 | -.178 |
| -.0225 | -.6871 | .9451 | -.325 | .0891 |
| .126 | .7954 | -.4158 | .1287 | -.2156 |
| -.1975 | -.3265 | -.5759 | .2110 | .1152 |

| Feature 0_norm | Feature 1_norm | Feature 3_norm | Feature 4_norm | Feature 5_norm |
|---|---|---|---|---|
| 8.0% | 38.1% | 35.5% | 9.8% | 8.6% |

*FIG. 6*

| | 720 | | | | 730 | 810 |
|---|---|---|---|---|---|---|
| | Feature 0 | Feature 1 | Feature 3 | Feature 4 | Feature 5 | Feature 2 | Prob Y |
| 721 | | | | | | Y | .835 |
| 722 | | | | | | N | .334 |
| 723 | | | | | | N | .014 |
| 724 | | | | | | Y | .678 |

DISCRIMINATION LIKELIHOOD ESTIMATE FOR TRAINED MACHINE LEARNING MODEL

BACKGROUND

Supervised learning is a type of machine learning in which a model is trained based on training data records, each of which includes a target dimension and other specified dimensions. Supervised learning algorithms use the training data records to iteratively train a model to map the other specified dimensions to the target dimension. The trained model can then be used to infer a value of the target dimension based on input data which includes the specified dimensions. For purposes of the present description, the dimensions, or columns, of data records will be referred to as features.

The foregoing process may result in a trained model which replicates any discriminatory bias represented in the training data records. For example, the training data records may comprise historical data records which include personal demographic information and a target specifying a credit score. The training data records may include records in which the associated value of the credit score is unjustifiably lower for certain gender and/or racial categories than for other gender and/or racial categories. A model trained using these records will infer lower credit scores for the certain gender and/or racial categories than for the other categories.

It has been proposed to address this problem by removing potentially-discriminatory features (e.g., Race, Gender) from the training data records. However, removal of such features may reduce the predictive accuracy of the resulting trained model. Moreover, this removal might not even produce the intended effect due to inter-feature correlations within the training data records.

FIG. 1 illustrates correlations between features of training data records which may be used to train a model to predict the feature Credit Score. As shown, the features Height and Hobby are correlated to the discriminatory feature Gender. That is, values of the features Height and Hobby of a record are good predictors of the value of the feature Gender of the record.

Because the values of features Height and Hobby of a record provide information regarding the value of the feature Gender of the record, the discriminated-against category of the discriminatory feature (e.g., Female) might leak into the record even if the discriminatory feature Gender were removed from the training data records. Accordingly, the removal of discriminatory features from training data records may fail to satisfactorily reduce bias of a resulting trained model.

Systems are desired to efficiently address discriminatory bias within historical training data records. Such systems preferably provide improved predictive accuracy in comparison to systems which simply remove discriminatory features from the records. Desired systems may also address information leakage in an efficient and user-friendly manner.

BRIEF DESCRIPTION OF THE DRAWINGS

FIG. 4 is a tabular representation of training data records according to some embodiments.

FIG. 5 is a tabular representation of record-specific influence values for a model trained to infer a value of a target feature according to some embodiments.

FIG. 6 is a tabular representation of normalized aggregated influence values for a model trained to infer a value of a target feature according to some embodiments.

DETAILED DESCRIPTION

The following description is provided to enable any person in the art to make and use the described embodiments. Various modifications, however, will be readily-apparent to those in the art.

Some embodiments relate to addressing bias within iteratively-trained models. According to some embodiments, a main model is trained to infer a target based on a plurality of training data records. The training data records include the target, at least one discriminatory feature (e.g., Gender), and other features. A subset of the other features is identified, in which the features of the subset are the most correlated to a discriminated category (e.g., Female) of the discriminatory feature. As will be described in detail below, the subset of features (referred to as "discriminatory identifier features" herein) may be determined by training a secondary model to classify the discriminatory features based on the other features of the training data records, and then analyzing the influences of each of the other features to inferences of the secondary model which output the discriminated category.

Next, an influence of each of the discriminatory identifier features on the main model is determined. These influences are used to estimate a discrimination likelihood associated with the main model. For example, the influences of each of the discriminatory identifier features on the main model may be expressed as normalized percentages and summed to generate the discrimination likelihood. In some embodiments, the sum may be weighted by an average probability associated with the discriminated category by the secondary model.

The plurality of training data records may comprise more than one discriminatory feature. If so, the above process may be repeated for each other discriminatory feature, including training a respective secondary model for each other discriminatory feature to determine discriminatory identifier features for the discriminatory feature, and estimating a discrimination likelihood for each discriminatory feature. The discrimination likelihoods estimated for each discriminatory feature may then be summed to generate a composite discrimination likelihood for the trained main model.

Embodiments may therefore preserve predictive accuracy by using all feature of the training data records while also providing a user with insight for determining whether or not to use the trained main model. The insight may also be useful for evaluating the reliability or desirability of a target inferred by the model.

Figure 2:
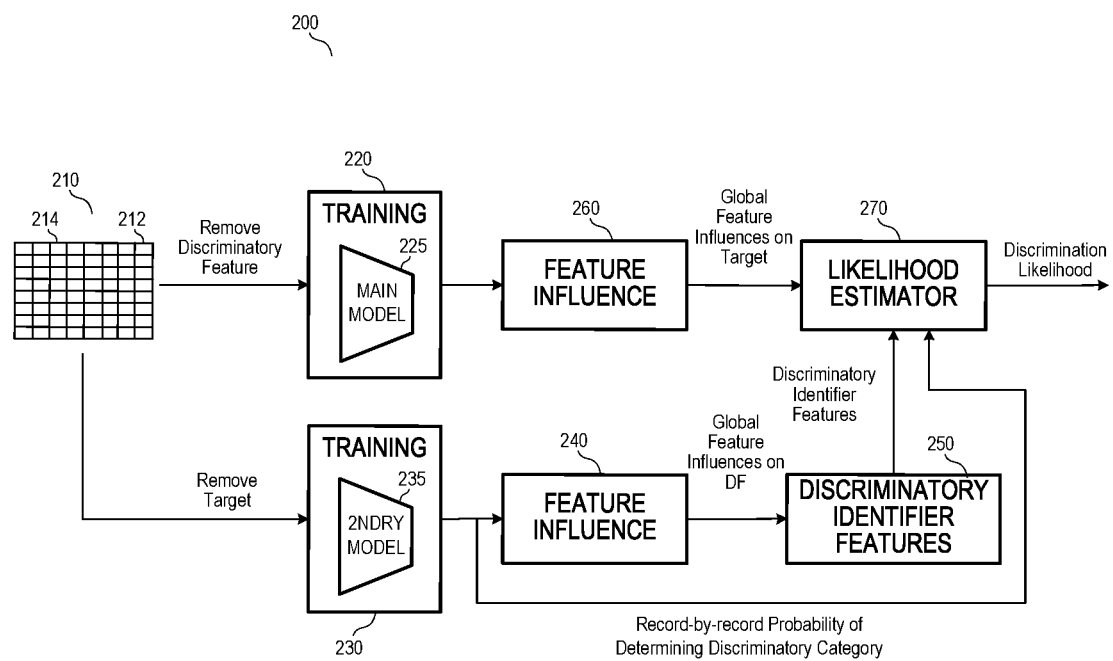
FIG. 2 is a block diagram of an architecture to estimate discrimination likelihood associated with a trained model according to some embodiments.

FIG. 2 is a block diagram of architecture 200 to estimate discrimination likelihood associated with a trained model according to some embodiments. The illustrated components may be implemented using any suitable combination of computing hardware and/or software that is or becomes known. In some embodiments, two or more components are implemented by a single computing device. Two or more components of FIG. 2 may be co-located. One or more components may be implemented as a cloud service (e.g., Software-as-a-Service, Platform-as-a-Service). A cloud-based implementation of any components of FIG. 2 may apportion computing resources elastically according to demand, need, price, and/or any other metric.

Training data records 210 may comprise records of a database table. The records may comprise a query result based on one or more persisted database tables. Each record of training data records 210 may include a value of a corresponding database column, or feature. The values of each feature may conform to any suitable format. In some embodiments, training data records 210 may comprise a random sampling of records from a much larger set of records.

Training data records 210 include target 212. The other features of training data records 210 include discriminatory feature 214. In one example, target 212 is Credit Score and discriminatory feature 214 is Gender. In another example, target 212 is Loan Approval Recommendation and discriminatory feature 214 is Race. Embodiments may involve any suitable target and discriminatory feature.

Training data records 210 may include more than one discriminatory feature. Handling of such scenarios to estimate a discrimination likelihood according to some embodiments will be described in detail below.

Training data records 210, with discriminatory feature 214 removed, are input to training component 220 for the purpose of training main model 225 to infer a value of target 212 based on respective values of the features of training data records 210 other than target 212 and discriminatory feature 214.

Main model 225 may comprise any type of iterative learning-compatible network, algorithm, decision tree, etc., that is or becomes known. Main model 225 may be designed to perform any desired inference task, including but not limited to binary classification (i.e., inference of a category from a set of two known categories), multiclass classification (i.e., inference of a category from a set of more than two known categories) and regression (i.e., inference of a number).

Main model 225 may comprise a network of neurons which receive input, change internal state according to that input, and produce output depending on the input and internal state. The output of certain neurons is connected to the input of other neurons to form a directed and weighted graph. The weights as well as the functions that compute the internal states are iteratively modified during training using supervised learning algorithms as is known.

Training component 220 may comprise any suitable algorithms and hardware for training main model 225 based on training data records 210. Generally, training of main model 225 comprises inputting features of each training data record 210 (other than target 212 and discriminatory feature 214) into main model 225, retrieving resulting values output by main model 225, comparing the output values to corresponding actual values of target 212, modifying main model 225 based on the comparison, and continuing in this manner until the difference between the output values and the actual values of target 212 (i.e., the network loss) is satisfactory. As explained above, trained main model 225 may contain indirect discriminatory bias due to features of records 210 which are correlated to discriminatory feature 214.

Training data records 210, with the exception of target 212, are also used by training component 230 to train secondary model 235. Secondary model 235 may comprise any binary classification model that is or becomes known. In this regard, the values of discriminatory feature 214 are binarized into a discriminated category and a non-discriminated category prior to training secondary model 235. For example, values Black and Latino of a Race feature may be changed to Y and values White and Asian of the Race feature may be changed to N. In another example, all values greater than 60 of an Age feature may be changed to Older while all values less than 60 may be changed to Younger.

Training of secondary model 235 is intended to facilitate identification of a subset of other features which are most-correlated to a discriminated category (e.g., Female) of discriminatory feature 214. The presence of these other features in the training set of main model 225 may cause main model 225 to contain indirect discriminatory bias due to this correlation. Secondary model 235 may be trained by inputting feature of each training data record 210 (other than target 212 or discriminatory feature 214) to secondary model 235, retrieving resulting values output by secondary model 235, comparing the output values to corresponding actual values of discriminatory feature 214, modifying secondary model 235 based on the comparison, and repeating this process until the difference between the output values and the actual values of discriminatory feature 214 (i.e., the network loss) is satisfactory.

Feature influence component 240 analyses thusly-trained secondary model 235 with respect to each record 210 associated with the discriminated category of the discriminatory feature. For each feature (other than target 212 or feature 214) of such records 210, feature influence component 240 determines a value indicating an influence of that feature to the discriminated category which is generated by trained secondary model 235 based on the record. In some embodiments, feature influence component 240 may determine SHapely Additive eXplanations (i.e., SHAP values) for each feature of each record based on trained secondary model 235.

Discriminatory identifier features component 250 determines one or more discriminatory identifier features correlated to discriminatory feature 214 based on the influence values determined by feature influence component 240. In some embodiments, and as will be described in detail below, the absolute values of influence values for each feature are summed and the sums are normalized. Discriminatory identifier features component 250 may determine the discriminatory identifier features as those features associated with the N (e.g., three) greatest normalized sums.

Feature influence component 260 analyses trained main model 225 with respect to each of training data records 210. For each feature (other than target 212 and discriminatory feature 214), feature influence component 240 determines a value indicating an influence of that feature on the value which is generated by trained main model 225 based on its record. Likelihood estimator 270 estimates a discrimination likelihood based on the influences determined by feature influence component 260, the discriminatory identifier features determined by discriminatory identifier features component 250, and the output probability which trained secondary model 235 associates with each record of its training set.

In some embodiments, for each training record which results in output of the discriminated category by trained model 235, the associated output probability is multiplied by a sum of the normalized influences of the discriminatory identifier features on trained main model 225 to determine a record-specific local discrimination likelihood. A global discrimination likelihood associated with trained main model 225 may be determined as an average of all determined local discrimination likelihoods. The discrimination likelihood may be presented to a user in order to facilitate user evaluation of trained main model 225.

In a case that training data records 210 include a second discriminatory feature, a second binary classification model is trained as described above with respect to the second discriminatory feature. The values of the second discriminatory feature are binarized into a discriminated category and a non-discriminated category, and the training is intended to facilitate identification of a subset of features which are correlated to the discriminated category.

Feature influence component 240 and discriminatory identifier features component 250 may operate as described above based on the trained second binary classification model to determine discriminatory identifier features most-correlated to the second discriminatory feature, and likelihood estimator 270 may use these discriminatory identifier features, record-specific probabilities output by the trained second binary classification model, and the determined feature influences on trained main model 225 to estimate a discrimination likelihood for trained main model 225 corresponding to the second discriminatory feature. Likelihood estimator 270 may further determine a composite discrimination likelihood based on each estimated discriminatory feature-specific discrimination likelihood, for example by summing the discriminatory feature-specific discrimination likelihoods.

Figure 3:
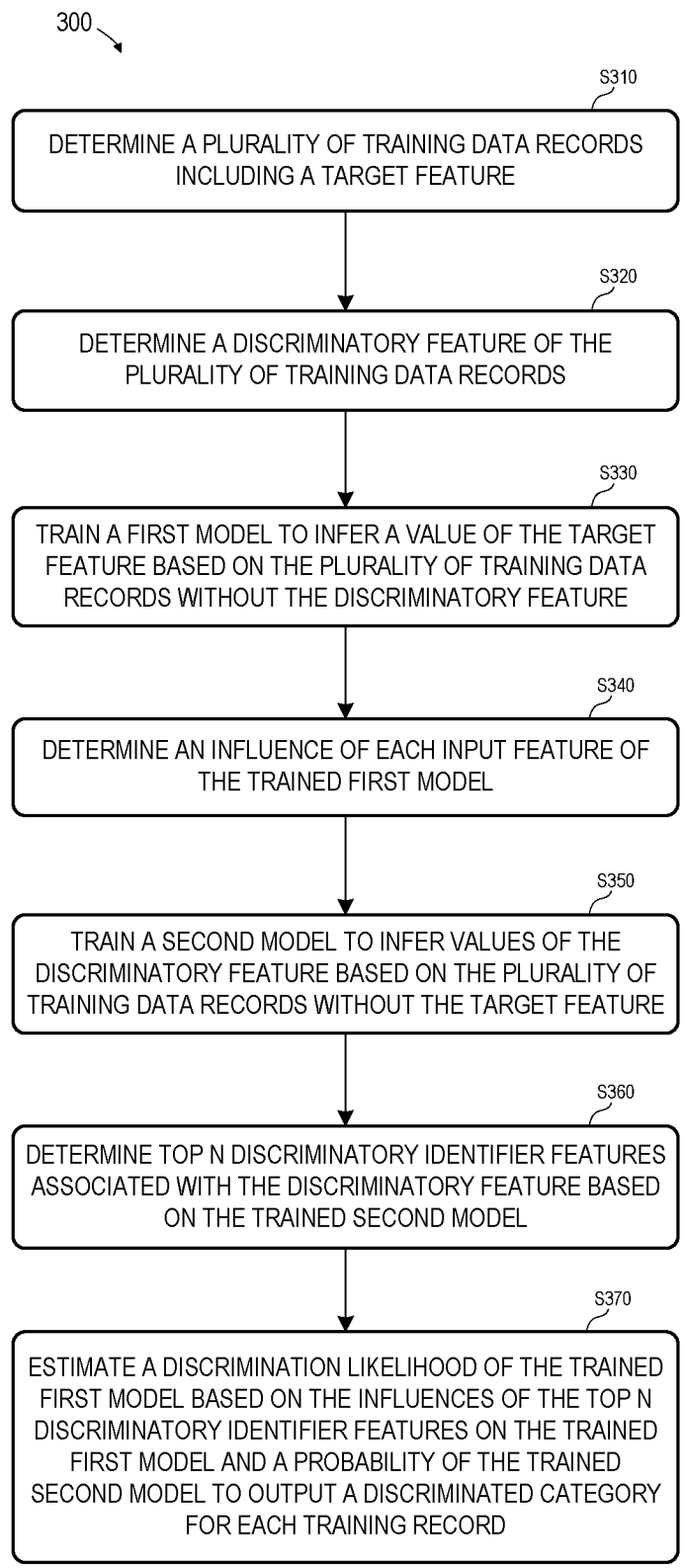
FIG. 3 comprises a flow diagram of a process to estimate discrimination likelihood associated with a trained model according to some embodiments.

FIG. 3 comprises a flow diagram of process 300 to estimate discrimination likelihood associated with a trained model according to some embodiments. Process 300 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any one or more processing units, including but not limited to a microprocessor, a microprocessor core, and a microprocessor thread. Embodiments are not limited to the examples described below.

A plurality of training data records are determined at S310. The training data records may comprise records of a database table and the target may comprise any numerical or categorical column of the table. Process 300 may be initiated by a request to generate a model to determine a classification or value based on a set of training data records.

FIG. 4 is a tabular representation of training data records 400 according to some embodiments. Training data records 400 include six non-target features and a target feature.

At S320, a discriminatory feature of the training data records is determined. The discriminatory feature may be identified in the request to generate the model. For example, the request may comprise a request to generate a model to determine a credit score based on a set of records, and the request may identify Race as a discriminatory feature within the records. The request may also identify discriminated categories or values of the discriminatory feature.

For purposes of the present example, it will be assumed that Feature 2 of training data records 400 is identified at S320 as a discriminatory feature. As described above, training data records 400 may include more than one discriminatory feature, but only one of the discriminatory features is determined at S320 of the present example.

Figure 1:
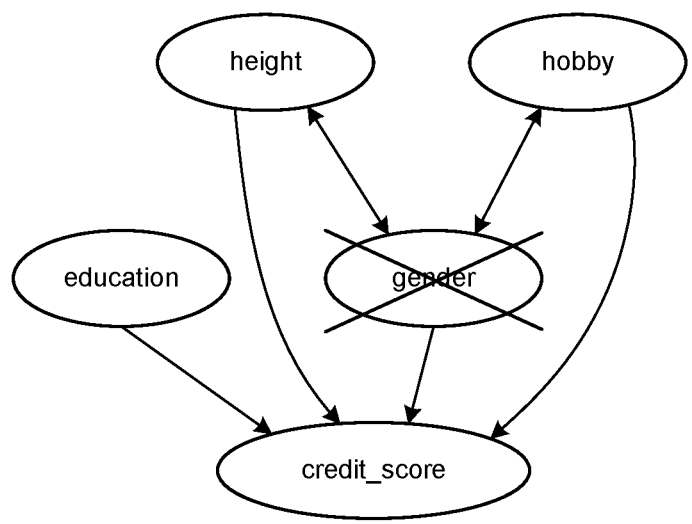
FIG. 1 illustrates correlations between features of training data records.

A first model is trained at S330 to infer a value of the target feature based on the plurality of training data records determined at S310. The first model may correspond to main model 225 of FIG. 1. Accordingly, training of the first model at S330 may comprise inputting features of each training data record 210 other than target feature 212 and discriminatory feature 214 to the first model, retrieving resulting inferred values output by the first model, comparing the output inferred values to corresponding actual values of the target feature, modifying the first model based on the comparison, and continuing in this manner until the difference between the output inferred values and the actual values of the target feature is satisfactory.

An influence of each of the input features (i.e., all features of the training data records except for the target feature and the discriminatory feature) on the trained first model is determined at S340. Determination of the influences may comprise determination a value indicating an influence of each feature of each record to the inference which is generated by the trained model based on its record. FIG. 5 is a tabular representation of influence data 500 specific to each feature of each of records 400 used to train the first model at S330. The values of influence data 500 may comprise SHAP values determined as is known in the art.

According to some embodiments, the influence of each feature on the trained model is determined at S340 by summing the absolute values of each influence value associated with the feature. This determination is performed for all input features of the trained first model. With respect to FIG. 5, the absolute values of each column of data 500 are summed to generate a sum for each of the five columns, which are, respectively, 0.561, 2.6636, 2.4808, 0.6836, 0.5979. The sums may be normalized based on their cumulative total in order to determine a normalized inference value for each feature, with all five normalized inference values totaling 100%. FIG. 6 illustrates table 600 including a normalized inference value for each of the five input features of the present example.

Next, at S350, a second model is trained to infer a categorization of the discriminatory feature based on the plurality of training data records determined at S310. S350 may include binarization of the values of the discriminatory feature within the records into a discriminated category and a non-discriminated category prior to training the second model.

Figures 7, 8:
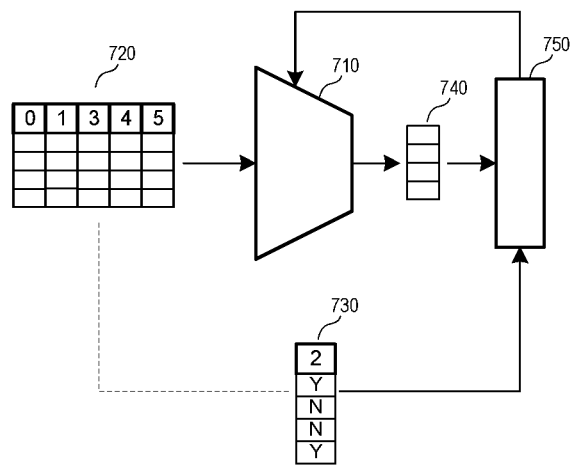
FIG. 7 is a block diagram illustrating iterative training of a model to infer a classification of a discriminatory feature according to some embodiments.
FIG. 8 comprises tabular representations of training data records and classification probabilities for a model to infer a classification of a discriminatory feature according to some embodiments.

FIG. 7 is a block diagram of iterative training of a second model to infer a classification of a discriminatory feature according to some embodiments of S350. Model 710 may comprise any suitable binary classification model. Model 710 is trained using input records 720 consisting of Features 0, 1, 3, 4 and 5 of records 400 and ground truth data 730 consisting of discriminatory Feature 2 of records 700. As shown, input records 720 do not include the target feature and the data of the records of Feature 2 has been binarized as described above.

Training at S350 may comprise execution of training iterations. One iteration according to some embodiments may include inputting records 720 to model 710, operating model 710 to output resulting inferred values 740 for each record of data 720, operating loss layer 750 to evaluate a loss function based on output inferred values 740 and known ground truth data 730, and modifying model 710 based on the evaluation. Iterations continue until model performance is satisfactory. Determination of model performance may include determination of any one or more metrics of model accuracy, precision, etc. that are or become known. For example, in the case of binary classification, model performance may be determined using the Area Under the Receiver Operating Characteristic Curve (ROC AUC) metric.

One or more discriminatory identifier features associated with the discriminatory feature are determined at S360. The determined discriminatory identifier features may consist of a predetermined number of (i.e., N) features having a greatest influence on the output of the second trained model, one or more features having an influence greater than a predefined threshold, or the like. The determined discriminatory identifier features therefore consist of input features which are most closely correlated to the discriminatory feature within the training data records.

According to some embodiments, the discriminatory identifier features are determined by determining feature-specific normalized influence values based on record-specific influence values derived from the trained second model as described above with respect to S340 and FIGS. 5-6. The top N discriminatory identifier features are then determined based on the feature-specific normalized influence values. For purposes of the present example, it will be assumed that Feature 0 and Feature 1 are determined as the discriminatory identifier features due to having the highest normalized influence values of all the input features to the second trained model.

A discrimination likelihood associated with the trained first model is estimated at S370. Estimation of the discrimination likelihood may comprise determining a local discrimination likelihood for each training data record associated with a discriminated category. The local discrimination likelihood for a training data record is estimated based on the influences of the top N discriminatory identifier features on the trained first model and a probability of the discriminated category output by the trained second model based on the training data record. The particular calculation used at S370 may differ among embodiments, and one example is presented below.

FIG. 8 is a tabular representation of training data records 720 used to train the second model at S350. Also shown in FIG. 8 are column 730 indicating the binarized ground truth value (i.e., the value of discriminatory Feature 2) of each record, and column 810 indicating the probability associated with the discriminated category (i.e., Y) which is output by trained model 710 for each corresponding record.

Local discrimination likelihoods are determined only for training data records associated with the discriminated category. Accordingly, local discrimination likelihoods are determined for records 721 and 724, but not for records 722 and 723. In order to determine the local discrimination likelihoods, the normalized influence values of the top N discriminatory identifier features on the first trained model are determined. In the present example, the discriminatory identifier features are Feature 0 and Feature 1, as determined at S360 based on the feature-specific influence values associated with the second trained model. The normalized influence values of Feature 0 and Feature 1 for the first trained model are 8.0% and 38.1%, as shown in FIG. 6 and determined as described above.

The local discrimination likelihood for record 721 is determined by multiplying the sum of these normalized influence values (i.e., 8.0% and 38.1%) by the output probability associated with the record (i.e., 0.835). Therefore, the local discrimination likelihood for record 721 is (8.0%+38.1%)*0.835=38.50%. Similarly, the local discrimination likelihood for record 724 is (8.0%+38.1%) *0.678=31.26%. Such an estimation is performed for all for training data records associated with the discriminated category, and a global discrimination likelihood for the first trained model may be determined by averaging all of the determined local discrimination likelihoods.

S320 through S370 may be repeated as described above for any other discriminatory features of the training data records, in order estimate a global discrimination likelihood for each other discriminatory feature. In some embodiments, the discrimination likelihoods estimated for all discriminatory features are then combined (e.g., summed) to generate an overall discrimination likelihood associated with the trained second model.

Figure 9:
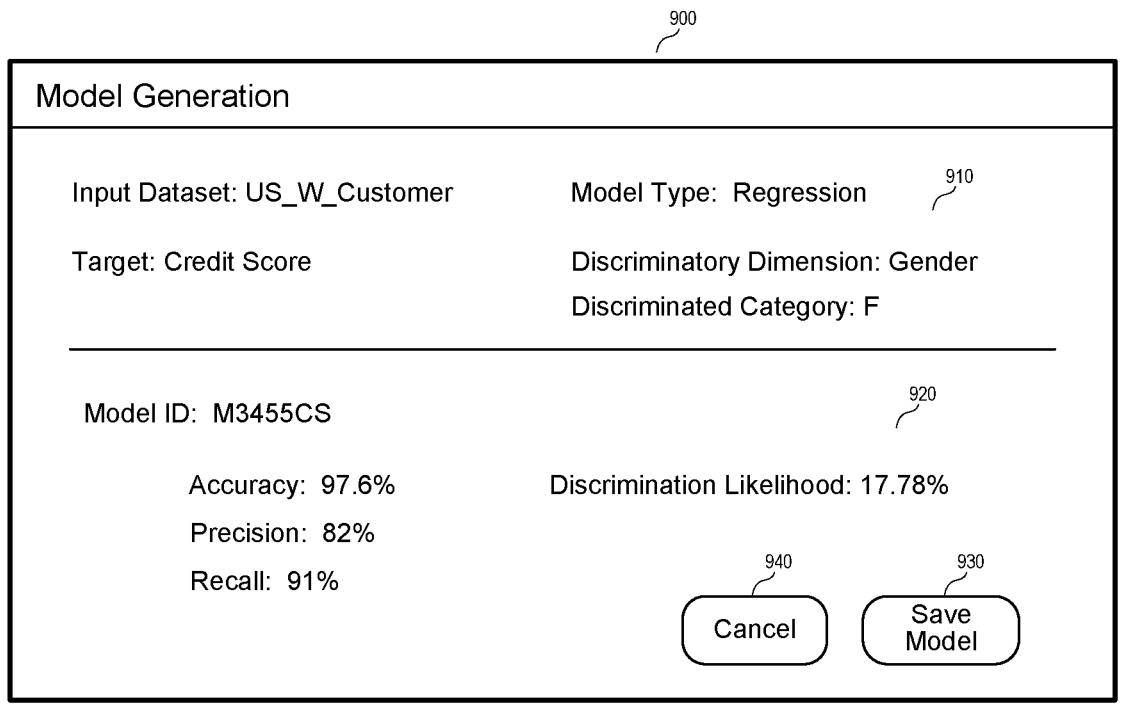
FIG. 9 illustrates an interface presenting a discrimination likelihood associated with a trained model according to some embodiments.

FIG. 9 illustrates interface 900 presenting a global discrimination likelihood associated with a trained model according to some embodiments. User interface 900 may be presented by a user device executing a client application (e.g., a Web application) which provides training of machine learning models.

User interface 900 includes area 910 presenting various configuration parameters based on which a trained model was generated. Such a trained model may correspond to main model 225 of FIG. 2 or to the first trained model of process 300. The configuration parameters include input training data records (i.e., table US_W_Customer), the type of model (i.e., Regression), and the target of the training data records (i.e., Credit Score) which the model is trained to infer. Area 910 also specifies a discriminatory feature of the training data records (i.e., Gender) and a discriminated category (i.e., F) of the discriminatory feature. As described above, embodiments are not limited to one discriminatory feature or to one discriminated category per discriminatory feature.

Area 920 provides information regarding a model which has been trained based on the configuration parameters of area 910. In particular, area 920 specifies an identifier of the trained model, values of accuracy, precision and recall performance metrics calculated for the trained model, and a global discrimination likelihood estimated as described herein. Embodiments are not limited to the information of area 920. A user may review the information provided in area 920 to determine whether to save the trained model for use in generating future inferences (e.g., via Save Model control 930) or to cancel generation of the model (e.g., via Cancel control 940).

Figure 10:
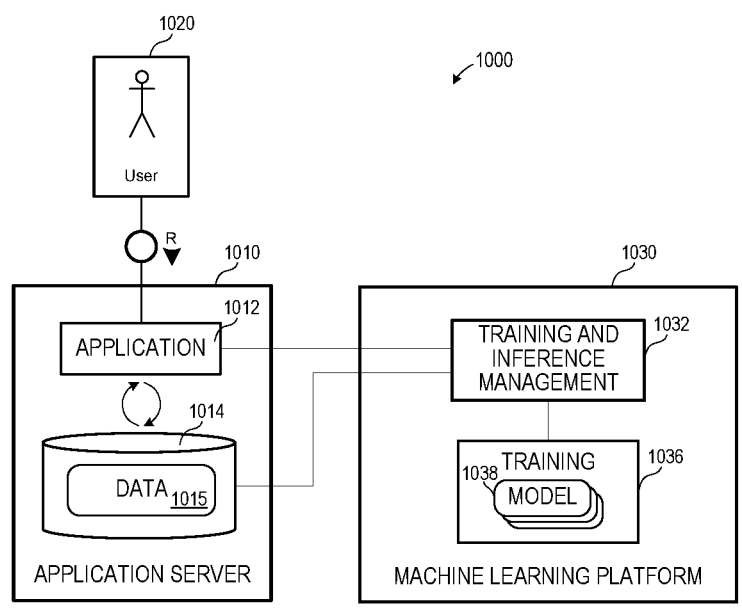
FIG. 10 illustrates a system to provide model training to applications according to some embodiments.

FIG. 10 illustrates system 1000 to provide model training to applications according to some embodiments. Application server 1010 may comprise an on-premise or cloud-based server providing an execution platform and services to applications such as application 1012. Application 1012 may comprise program code executable by a processing unit to provide functions to users such as user 1020 based on logic and on data 1015 stored in data store 1014. Data 1015 may be column-based, row-based, object data or any other type of data that is or becomes known. Data store 1014 may comprise any suitable storage system such as a database system, which may be partially or fully remote from application server 1010, and may be distributed as is known in the art.

According to some embodiments, user 1020 may interact with application 1012 (e.g., via a Web browser executing a client application associated with application 1012) to request a trained model based on training data records. The request may specify one or more discriminatory features of the records, and one or more discriminated categories of each discriminatory feature. In response, application 1012 may call training and inference management component 1032 of machine learning platform 1030 to request training of a corresponding model according to some embodiments.

Based on the request, training and inference management component 1032 may receive the specified training data from data 1015 and instruct training component 1036 to train a model 1038 based on the training data and to estimate discrimination likelihood associated with the trained model as described herein. Application 1012 may then use the trained model to generate inferences based on input data selected by user 1020.

In some embodiments, application 1012 and training and inference management component 1032 may comprise a single system, and/or application server 1010 and machine learning platform 1030 may comprise a single system. In some embodiments, machine learning platform 1030 supports model training and inference for applications other than application 1012 and/or application servers other than application server 1010.

Figure 11:
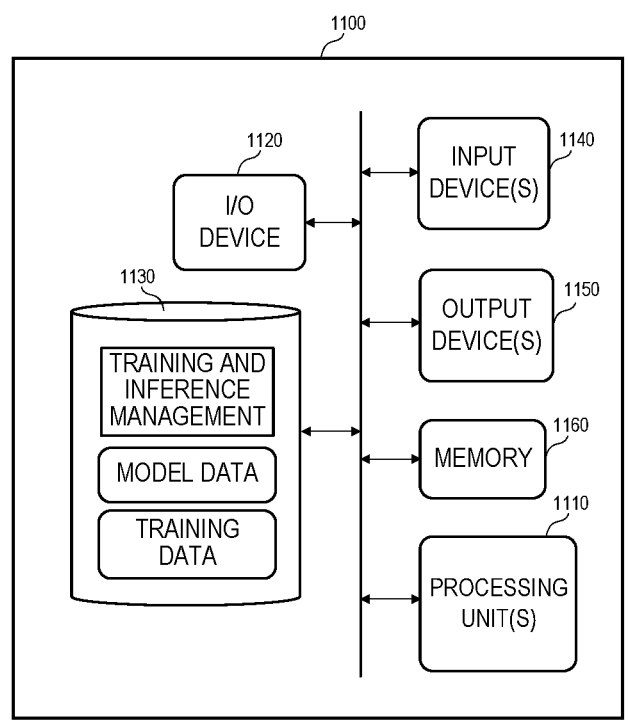
FIG. 11 is a block diagram of a hardware system for providing model training according to some embodiments.

FIG. 11 is a block diagram of a hardware system providing model training according to some embodiments. Hardware system 1100 may comprise a general-purpose computing apparatus and may execute program code to perform any of the functions described herein. Hardware system 1100 may be implemented by a distributed cloud-based server and may comprise an implementation of machine learning platform 1030 in some embodiments. Hardware system 1100 may include other unshown elements according to some embodiments.

Hardware system 1100 includes processing unit(s) 1110 operatively coupled to I/O device 1120, data storage device 1130, one or more input devices 1140, one or more output devices 1150 and memory 1160. I/O device 1120 may facilitate communication with external devices, such as an external network, the cloud, or a data storage device. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into hardware system 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, and RAM devices, while memory 1160 may comprise a RAM device.

Data storage device 1130 stores program code executed by processing unit(s) 1110 to cause system 1100 to implement any of the components and execute any one or more of the processes described herein. Embodiments are not limited to execution of these processes by a single computing device. Data storage device 1130 may also store data and other program code for providing additional functionality and/or which are necessary for operation of hardware system 1100, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
   a memory storing processor-executable program code; and
   at least one processing unit to execute the processor-executable program code to cause the system to:
   determine a plurality of records, each of the plurality of records associating each of a plurality of features with a respective value, a second feature with a second feature value, and a target feature with a target value;
   train a first machine learning model based on the plurality of records to output an inferred target value of the target feature based on first input values of each of the plurality of features;
   train a second machine learning model based on the plurality of records to output an inferred second feature value of the second feature based on the second input values of each of the plurality of features;
   determine, based on the trained second machine learning model, a first one or more of the plurality of features which are correlated to the second feature;
   determine an influence of each of the first one or more features on the trained first machine learning model;
   determine a first value indicating a discrimination likelihood of the trained first machine learning model with respect to the second feature based on the determined influences and on the trained second machine learning model;
   receive a command to cancel generation of the trained first machine learning model based on the discrimination likelihood; and
   in response to the received command, cancel generation of the trained first machine learning model.

2. A system according to claim 1, wherein determination of the first one or more of the plurality of features which are correlated to the second one of the first plurality of features comprises determination of one or more of the plurality of features having a greatest influence on the trained second machine learning model.

3. A system according to claim 2, the at least one processing unit to execute the processor-executable program code to cause the system to:
   train a third machine learning model based on the plurality of records to output an inferred value of a third feature based on third input values of each of the plurality of features except for the third feature and the second feature;

determine, based on the trained third machine learning model, a second one or more of the plurality of features which are correlated to the third feature;

determine an influence of each of the second one or more features on the trained first machine learning model; and determine a second value indicating a discrimination likelihood of the trained first machine learning model with respect to the third feature based on the determined influences of each of the second one or more features and on the trained third machine learning model; and determine a composite value associated with the trained first machine learning model based on the first value and the second value.

4. A system according to claim 3, the at least one processing unit to execute the processor-executable program code to cause the system to:

determine, based on the trained second machine learning model, a first probability associated with a category of the second feature; and determine, based on the trained third machine learning model, a second probability associated with a category of the third feature, wherein determination of the first value is based on the first probability and on the determined influences of each of the first one or more features, and wherein determination of the second value is based on the second probability and on the determined influences of each of the second one or more features.

5. A system according to claim 2, the at least one processing unit to execute the processor-executable program code to cause the system to:

determine, based on the trained second machine learning model, a first probability associated with a category of the second feature, wherein determination of the first value is based on the determined influences and the first probability.

6. A system according to claim 2, wherein training of the second machine learning model comprises:

converting all second feature values of the second feature into either one of a discriminated category and a non-discriminated category.

7. A system according to claim 6, the at least one processing unit to execute the processor-executable program code to cause the system to:

determine, based on the trained second machine learning model, a first probability associated with a category of the second feature, wherein determination of the first value is based on the determined influences and the first probability.

8. A method comprising:

receiving a plurality of records, each of the plurality of records associating each of a plurality of features with a respective value, a second feature with a second feature value, and a target feature with a target value;

training a first machine learning model based on the plurality of records to output an inferred target value of the target feature based on first input values of each of the plurality of features;

training a second machine learning model based on the plurality of records to output an inferred second feature value of the second feature based on second input values of each of the plurality of features;

determining, based on the trained second machine learning model, a first one or more of the plurality of features which are correlated to the second feature;

determining an influence of each of the first one or more features on the trained first machine learning model;

determining a first discrimination likelihood of the trained first machine learning model with respect to the second feature based on the determined influences and on the trained second machine learning model;

receiving a command to cancel generation of the trained first machine learning model based on the discrimination likelihood; and in response to the received command, cancelling generation of the trained first machine learning model.

9. A method according to claim 8, wherein determining the first one or more of the plurality of features which are correlated to the second one of the first plurality of features comprises determining of one or more of the plurality of features having a greatest influence on the trained second machine learning model.

10. A method according to claim 9, further comprising:

training a third machine learning model based on the plurality of records to output a value of a third feature based on third input values of each of the plurality of features except for the third feature and the second feature;

determining, based on the trained third machine learning model, a second one or more of the plurality of features which are correlated to the third feature;

determining an influence of each of the second one or more features to the trained first machine learning model; and determining a second value indicating a discrimination likelihood of the trained first machine learning model with respect to the third feature based on the determined influences of each of the second one or more features and based on the trained third machine learning model; and determining a composite discrimination likelihood associated with the trained first machine learning model based on the first value and the second value.

11. A method according to claim 10, further comprising:

determining, based on the trained second machine learning model, a first probability associated with a category of the second feature; and determining, based on the trained third machine learning model, a second probability associated with a category of the third feature, wherein determining the first value is based on the first probability and the determined influences on the trained second machine learning model, and wherein determining the second value is based on the determined influences on the trained third machine learning model and the second probability.

12. A method according to claim 8, further comprising:

determining, based on the trained second machine learning model, a first probability associated with a category of the second feature, wherein determining the first value is based on the determined influences and the first probability.

13. A method according to claim 9, wherein training of the second machine learning model comprises:

converting all second feature values of the second feature into either one of a discriminated category and a non-discriminated category.

14. A method according to claim 13, further comprising:

determining, based on the trained second machine learning model, a first probability associated with a category of the second feature, wherein determining the first value is based on the determined influences and the first probability.

15. A non-transitory medium storing executable program code executable by at least one processing unit of a computing system to cause the computing system to:
receive a plurality of records, each of the plurality of records associating each of a plurality of features with a respective value, a second feature with a second feature value, and a target feature with a target value;
train a first machine learning model based on the plurality of records to output an inferred target value of the target feature based on first input values of each of the plurality of features;
train a second machine learning model based on the plurality of records to output an inferred second feature value of the second feature based on second input values of each of the plurality of features;
determine, based on the trained second machine learning model, a first one or more of the plurality of features which are correlated to the second feature;
determine an influence of each of the first one or more features on the trained first machine learning model;
determine a first value indicating a discrimination likelihood of the trained first machine learning model with respect to the second feature based on the determined influences and on the trained second machine learning model;
receive a command to cancel generation of the trained first machine learning model based on the discrimination likelihood; and
in response to the received command, cancel generation of the trained first machine learning model.

16. A medium according to claim 15, wherein determination of the first one or more of the plurality of features which are correlated to the second one of the first plurality of features comprises determination of one or more of the plurality of features having a greatest influence on the trained second machine learning model.

17. A medium according to claim 16, the program code executable by at least one processing unit of a computing system to cause the computing system to:
train a third machine learning model based on the plurality of records to output an inferred value of a third feature based on third input values of each of the plurality of features except for the third feature and the second feature;

determine, based on the trained third machine learning model, a second one or more of the plurality of features which are correlated to the third feature;
determine an influence of each of the second one or more features on the trained first machine learning model;
determine a second value indicating a discrimination likelihood of the trained first machine learning model with respect to the third feature based on the determined influences of each of the second one or more features and on the trained third machine learning model; and
determine a composite value associated with the trained first machine learning model based on the first value and the second value.

18. A medium according to claim 17, the program code executable by at least one processing unit of a computing system to cause the computing system to:
determine, based on the trained second machine learning model, a first probability associated with a category of the second feature; and
determine, based on the trained third machine learning model, a second probability associated with a category of the third feature,
wherein determination of the first value is based on the first probability and on the determined influences of each of the first one or more features, and
wherein determination of the second value is based on the second probability and on the determined influences of each of the second one or more features.

19. A medium according to claim 16, the program code executable by at least one processing unit of a computing system to cause the computing system to:
determine, based on the trained second machine learning model, a first probability associated with a category of the second feature,
wherein determination of the first value is based on the determined influences and the first probability.

20. A medium according to claim 16, wherein training of the second machine learning model comprises:
converting all second feature values of the second feature into either one of a discriminated category and a non-discriminated category.

* * * * *